United States Patent
Suzuki

(10) Patent No.: US 7,332,544 B2
(45) Date of Patent: Feb. 19, 2008

(54) CHLORINATED VINYL CHLORIDE RESIN COMPOSITION

(75) Inventor: Takeyuki Suzuki, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/553,733

(22) PCT Filed: Apr. 19, 2004

(86) PCT No.: PCT/JP2004/005578

§ 371 (c)(1),
(2), (4) Date: Aug. 21, 2006

(87) PCT Pub. No.: WO2004/096908

PCT Pub. Date: Nov. 11, 2004

(65) Prior Publication Data

US 2007/0043170 A1  Feb. 22, 2007

(30) Foreign Application Priority Data

Apr. 25, 2003 (JP) .............................. 2003-122483

(51) Int. Cl.
C08L 47/00 (2006.01)
C08L 23/28 (2006.01)

(52) U.S. Cl. .................... 525/228; 525/192; 525/227; 525/239

(58) Field of Classification Search ................ 525/192, 525/227, 239, 228
See application file for complete search history.

(56) References Cited

U.S. PATENT DOCUMENTS 4,584,349 A * 4/1986 Lehr ......................... 525/227

FOREIGN PATENT DOCUMENTS

| JP | 49-18102 | 5/1974 |
|----|----------|--------|
| JP | 59-108055 | 6/1984 |
| JP | 60-177061 | 9/1985 |
| JP | 60-177062 | 9/1985 |
| JP | 2-105842 | 4/1990 |
| JP | 8-113685 | 5/1996 |
| JP | 10-287782 | 10/1998 |
| JP | 2001-19818 | 1/2001 |
| JP | 2002-241563 | 8/2002 |

OTHER PUBLICATIONS

English language translation of JP 10-287782, publication date: Oct. 27, 1998.*
English language translation of JP 8-113685, publication date: May 7, 1996.*
International Preliminary Report on Patentability dated Mar. 9, 2006, issued in corresponding PCT/JP2004/005578, with Form PCT/IB/338.

* cited by examiner

Primary Examiner—Fred Teskin
(74) Attorney, Agent, or Firm—Westerman, Hattori, Daniels & Adrian, LLP.

(57) ABSTRACT

A chlorinated vinyl chloride-based resin composition in which from 2 to 9 parts by weight of an MBS resin and from 0.5 to 3 parts by weight of chlorinated polyethylene are blended to 100 parts by weight of a chlorinated vinyl chloride-based resin with a chlorine content of from 62 to 70% by weight obtained by post-chlorinating a vinyl chloride-based resin, which can provide an injection molding product such as a joint of excellent heat resistance, impact strength, moldability and surface property.

18 Claims, No Drawings

CHLORINATED VINYL CHLORIDE RESIN COMPOSITION

TECHNICAL FIELD

The present invention concerns a chlorinated vinyl chloride-based resin composition and, more in particular, it relates to a chlorinated vinyl chloride-basedresin composition excellent in the balance of the impact strength, heat resistance and the moldability, as well as favorable in the surface property when it is injection molded, for example, into a joint.

BACKGROUND ART

Molding products of chlorinated vinyl chloride-based resins have a feature of high heat resistance and are used in application uses relatively at high temperature, for which existent molding products of vinyl chloride-based resins can not be used because of heat deformation. For example, by utilizing that their heat deformation temperature is higher by 20 to 40° C. than that of the vinyl chloride resin molding products, their use includes pipes for hot water and joints thereof, or sheets for use in home electronics undergoing heat.

On the other hand, it has been known that the molding products of the vinyl chloride-based resin are poor in the impact resistance. Since the impact resistance is poor, when pipes made of chlorinated vinyl chloride-based resins are cut by a pipe cutter, pipes can not be cut neatly to sometimes cause chipping or cracking. Further, such drawbacks sometime result in cracking by machining or the like also in joints, sheets or plates, so that it has been demanded for molding products of chlorinated vinyl chloride-based resins with improved impact resistance. For improving the impact resistance, it is known by Canadian Patent No. 722769 to blend an ABS resin with a chlorinated vinyl chloride-based resin composition and it is known by U.S. Pat. No. 3,646, 163 to blend an MBS resin in a chlorinated vinyl chloride-based resin composition. However, while the blends provide an effect of improving the impact resistance, they involve a problem of moldability such as burning due to its high melt viscosity upon molding. Further, in a case of injection molding joints or the like with the blend described above, it also results in a problem of blooming on the surface, resulting in a problem that no molding product having good surface property can be obtained.

On the other hand, for lowering the melt viscosity during molding thereby improving the moldability, JP-B-49-18102 proposes blending an ABS resin and/or MBS resin with chlorinated polyethylene in a chlorinated vinyl chloride-based resin composition. Further, U.S. Pat. No. 5,194,471 proposes blending of an ABS resin having a predetermined Shore D hardness and a chlorinated polyethylene in a chlorinated vinyl chloride-based resin composition with an aim of improving the drop weight impact strength at a low temperature of a pipe as described in ASTM D 2846. In the chlorinated vinyl chloride-based resin compositions, while moldability such as burning is improved and the effect of improving the impact resistance is also observed, the problems of blooming on the surface of the molding products can not be solved in a case of applying the blends described above to the injection molding of joints, etc., and it has been demanded for a chlorinated vinyl chloride-based resin composition capable of obtaining favorable surface property in the injection molding of joints, etc. while maintaining heat resistance, impact strength and moldability.

Further, in a case of large-sized injection molding products where the weight of the molding product is as large as about 3 kg or more such as a joint of 10 inch φ diameter, since the impact strength can be kept to some extent by the effect of wall thickness, importance is attached particularly to the heat resistance, the moldability and the surface property rather than the impact strength. In such large size injection molding, abnormality for the surface property tends to occur due to heat generation under sharing in the nozzle during injection molding and excellent moldability is an essential condition because of large size of the molding products. However, known compositions are poor in the moldability and involve a serious problem for the surface property of accompanying worsening of the surface property (blooming) and it has been demanded for a chlorinated vinyl chloride-based composition of excellent heat resistance, moldability and surface property.

DISCLOSURE OF THE INVENTION

An object of the present invention is to provide a chlorinated vinyl chloride-based resin composition capable of obtaining a favorable surface property in injection molding of joints or the like while maintaining the heat resistance, the impact strength and the moldability. Further, it intends to provide a chlorinated vinyl chloride-based resin composition excellent in the moldability and the surface property for the application uses such as large injection molded articles in which the impact strength is maintained by the effect of wall thickness.

The present inventor has made various studies on the chlorinated vinyl chloride-based resin compositions, and has found that the combination of an impact modifier and a chlorinated polyethylene, with an average polymerization degree of chlorinated vinyl chloride resin and an optional acrylic resin for improving the processability of vinyl chloride , which has been overlooked so far can provide, unexpectedly presents an effect of obtaining a favorable surface property while maintaining the heat resistance, the impact strength and the moldability of the chlorinated vinyl chloride-based resin composition for use in injection molding such as a joint, and has accomplished the present invention.

That is, the present invention concerns (1) a chlorinated vinyl chloride-based resin composition suitable to injection molding in which from 2 to 9 parts by weight of an MBS resin and from 0.5 to 3 parts by weight of a chlorinated polyethylene are blended to 100 parts by weight of a chlorinated vinyl chloride-based resin with a chlorine content of from 62 to 70% by weight obtained by post-chlorinating a vinyl chloride-based resin, further (2) a chlorinated vinyl chloride-based resin composition in which from 0.5 to 3 parts by weight of an acrylic resin for improving the processability of vinyl chloride is further blended with the blend in (1) above, (3) a chlorinated vinyl chloride-based resin composition as described above, which uses a chlorinated vinyl chloride-based resin with a chlorine content of from 67 to 69% by weight obtained by post-chlorinating a vinyl chloride-based resin having an average polymerization degree of 650 or less, (4) the chlorinated vinyl chloride-based resin composition described above in which the butadiene content of the MBS resin is 60% by weight or more, (5) the chlorinated vinyl chloride-based resin composition described above in which the chlorine content of the chlorinated polyethylene is from 20 to 45% by weight, (6) the chlorinated vinyl chloride-based resin composition described above in which the acrylic resin for improving the processability of vinyl chloride comprises polymethyl methacrylate as a main ingredient and has a specific viscosity at 30° C. of not exceeding 1.5 when 0.4 g thereof is dissolved in 100 ml of benzene, (7) the chlorinated vinyl chloride-based resin composition described above in which a Vicat softening point at a load of 5 kg is 105° C. or higher, (8) the chlorinated vinyl chloride-based resin composition according to any one of (2) to (7) described above, wherein the butadiene content is from 1 part by weight or more and 6 parts by weight or less based on 100 parts of the chlorinated vinyl chloride-based resin, and (9) the chlorinated vinyl chloride-based resin composition used for heat resistant joints.

BEST MODE FOR PRACTICING THE INVENTION

The chlorinated vinyl chloride-based resin used in the present invention is usually produced, for example, by a method of using a vinyl chloride-based resin as a starting material and chlorinating the same in an aqueous medium by supplying chlorine in a state of dispersing the vinyl chloride-based resin in an aqueous medium and irradiating the same by a mercury lamp, chlorinating under heating or chlorinating in the presence of a catalyst, or a method of chlorinating in a gas phase of conducting chlorination for the vinyl chloride-based resin in a gas phase under the irradiation of a mercury lamp.

The average polymerization degree of the vinyl chloride-based resin before chlorination as the starting material is usually 1500 or less, preferably, 650 or less and preferably 400 or more. Further, the degree of chlorination in the chlorinated vinyl chloride-based resin is usually from 62 to 70% by weight, preferably from 67 to 69% by weight. When the average polymerization degree exceeds 1500, the processability is poor. On the other hand, when the average polymerization degree is less than 400, the impact resistance property tends to be lowered which is not preferred. Further, in a case where the degree of chlorination is 62% by weight or less, a composition having a sufficient heat resistance can not be obtained, whereas when the degree of chlorination exceeds 70%, the melt viscosity increases to bring about a technical difficulty in processing the resin composition, which is not preferred.

As a combination of the average polymerization degree and the degree of chlorination, the average polymerization degree of 650 or less and the degree of chlorination of from 67 to 69% by weight is further preferred since this can provide a chlorinated vinyl chloride-based resin composition for use in injection molding having favorable surface property and high heat resistance.

The vinyl chloride-based resin as a starting material includes homopolymers of vinyl chloride, and copolymers of vinyl chloride and other copolymerizable monomers, for example, ethylene, propylene, vinyl acetate, allylchloride, allylglycidiyl ether, acrylic acid ester, and vinyl ether.

The present invention concerns a chlorinated vinyl chloride-based resin composition for use in injection molding comprising from 2 to 9 parts by weight of an MBS resin and from 0.5 to 3 parts by weight of a chlorinated polyethylene based on 100 parts by weight of a chlorinated vinyl chloride resin.

The MBS resin is a methyl methacrylate-butadiene-styrene polymer which is used characteristically by from 2 to 9 parts by weight, preferably, from 2 to 7 parts by weight and further preferably, from 2 to 5 parts by weight. In a case where the blending amount of the MBS resin is less than 2 parts by weight, the impact resistance of the molding product is lowered, whereas if it exceeds 9 parts by weight, heat resistance as the property of the chlorinated vinyl chloride-based resin is deteriorated. As MBS particles, B56, B564, B12, B22, B31, B52 and B58 manufactured by Kaneka Corporation. or BTAIIINX manufactured by Kureha Co., Ltd. have been known, for example.

Generally, the MBS resin is added for maintaining the impact strength high, and the impact strength generally depends on the polybutadiene content based on the chlorinated vinyl chloride-based resin. On the contrary, the heat resistance and the moldability tend to be lowered depending on the polybutadiene content. Then, it is preferred to balance the properties described above while taking notice on the butadiene content contained in the MBS resin. The polybutadiene content of the present invention has no particular restriction so long as it is within a range not deteriorating the gist of the present invention and a preferred range thereof is 1% by weight or more and 6% by weight or less, more preferably, 1.5% by weight or more and 5% by weight or less, further preferably, 1.8% by weight or more and 4% by weight or less and, particularly preferably, 2% by weight or more and 3.5% by weight or less based on the chlorinated vinyl chloride-based resin. So long as the polybutadiene content relative to the chlorinated vinyl chloride-based resin is within a range of 1% by weight or more and 6% by weight or less, it is preferred since the balance is established between the impact resistance and the heat resistance of the molding product. Further, it is preferred that the polybutadiene content based on the chlorinated vinyl chloride-based resin is within a range of 1.5% by weight or more and 5% by weight or less, more preferably, 1.8% by weight or more and 4% by weight or less, and particularly preferably, 2.0% by weight or more and 3.5% by weight or less, since the fluidity of the chlorinated vinyl chloride-based resin composition is excellent in addition to the impact resistance and the heat resistance of the molding product.

Among the MBS resins described above, use of an MBS resin with the butadiene content of 60% or more is preferred since the impact resistance is improved while maintaining the heat resistance of the molding product. As such MBS, B56 and B564 manufactured by Kaneka Corporation. or BTAIIINX manufactured by Kureha Co., Ltd. etc. have been known.

The chlorinated vinyl chloride-based resin composition according to the present invention contains chlorinated polyethylene in addition to the MBS resin.

The chlorinated polyethylene in the present invention is a post-chlorinated polyethylene with a chlorine content of from 20 to 45% by weight and, preferably, from 30 to 40% and, as such chlorinated polyethylene, H 135 manufactured by Daiso, Tyrin 3615 and Tyrin 3611 manufactured by Dupon Dow Elastomer Co., or Elaslen 301A manufactured by Showa Denko Co. have been known. The heat resistance of the composition is deteriorated in a case where the chlorine content is 20% or less, whereas technical difficulty results in processing the composition in a case where the chlorine content exceeds 45%.

In the present invention, it is essential that the chlorinated polyethylene is contained from 0.5 to 3 parts by weight. This can provide a chlorinated vinyl chloride-based resin composition excellent in the impact resistance and at the same time, excellent in melting workability while maintaining the heat resistance. The impact resistance is not improved outstandingly in a case where the amount of chlorinated polyethylene is less than 0.5 parts by weight, whereas the heat resistance as the property of the chlorinated vinyl chloride resin is deteriorated in a case where it exceeds 3 parts by weight. It is preferred that the content of the chlorinated polyethylene is from 1 to 3 parts by weight since the property described above can be provided remarkably.

In the present invention, the acrylic resin for modifying the processability of vinyl chloride is preferably used for the improvement of the surface property. The acrylic resin for the improvement of the processability of the vinyl chloride is a resin for improving the processability of vinyl chloride comprising polymethyl methacrylate as a main ingredient and, as the acrylic resins for improving the processability of vinyl chloride, for example, PA10, PA20 and PA30 manufactured by Kaneka Corporation. have been known.

The chlorinated vinyl chloride-based resin composition blended with the MBS resin, the chlorinated polyethylene, etc. in order to enhance the impact strength tends to deteriorate the moldability, particularly, tends to lower the surface property. While the reason is not yet apparent, it may be considered that the melt viscosity increases along with addition of rubbers, which causes remarkable heat generation under shearing during molding, and low boiling products in the composition tend to be evaporated, and adhere to the surface of the molding product to result in disadvantage such as blooming.

In the present invention, it is preferred for the improvement of the surface property in a case of a composition with lowered moldability (fluidity), to add an acrylic resin for improving the processability of vinyl chloride to the chlorinated vinyl chloride-based resin and/or use a chlorinated vinyl chloride-based resin with a chlorine content of from 67 to 69% by weight obtained by post-chlorinating a vinyl chloride resin with an average polymerization degree of 650 or less.

The acrylic resin content for improving the processability of vinyl chloride, is preferably from 0.5 to 3 parts by weight. This can provide a chlorinated vinyl chloride-based resin composition having an outstandingly excellent surface property with no blooming on the surface while maintaining the heat resistance. It is not preferred that the amount of the acrylic resin to be blended for improving the processability of vinyl chloride is less than 0.5 parts by weight since the no outstanding improvement can be obtained in view of the blooming on the surface, and that it exceeds 3 parts by weight since the heat resistance as the property of the chlorinated vinyl chloride-based resin is deteriorated. Further, it is more preferable to use the acrylic resin for improving the processability of the vinyl chloride described above, having a specific viscosity at 30° C. less than 1.5 when 0.4 g of the resin is dissolved in 100 ml of benzene since improvement can be obtained for the blooming on the surface without increasing the melt viscosity by so much and the heat stability during fabrication can be maintained. As such acrylic resin for improving the processability of vinyl chloride, PA10 or PA20 manufactured by Kaneka Corporation. have been known.

In the present invention, to the chlorinated vinyl chloride-based resin composition described above, a stabilizer, a lubricant, a filler, a pigment, etc. used in usual chlorinated vinyl chloride-based resin compositions can be added within a range capable of attaining the object of the present invention, for use in joints for warm water and joints for high temperature liquid chemicals.

Among the chlorinated vinyl chloride-based resin compositions according to the present invention, since the compositions with addition of the acrylic resin for improving the processability of vinyl chloride are excellent in the surface property while having impact strength, heat resistance and moldability substantially identical with those of existent compositions, they can be used suitably for a wide range of application including from thin-walled and small-sized injection molding products to thick large-sized injection molding products. Further, among the chlorinated vinyl chloride-based resin compositions, those compositions excellent outstandingly in the moldability although the impact strength is not so large are used suitably to thick-walled injection molding products.

EXAMPLE

The present invention is to be described specifically with reference to examples and comparative examples. However, the present invention is not restricted only to the following examples.

In examples and comparative examples, "part" or "%" means "parts by weight" or "% by weight" unless otherwise specified particularly.

Example 1

A vinyl chloride resin having a polymerization degree of 700 was post-chlorinated to obtain a chlorinated vinyl chloride resin with a degree of chlorination of 66%. To 100 parts of the chlorinated vinyl chloride resin, were added 4 parts of B56 with the butadiene content of 70% in the entire MBS resin (MBS resin manufactured by Kaneka Corporation.) as an impact absorbent, 2 parts of H135 with a chlorine content of 35% (chlorinated polyethylene manufactured by Daiso Co.), 1 part by weight of PA 10 comprising polymethyl methacrylate as a main ingredient and having a specific viscosity at 30° C. of 0.99 when 0.4 g of resin was dissolved in 100 ml of benzene (resin for improving the processability of vinyl chloride manufactured by Kanegafuchi Chemical Co.), 3.5 parts of a tin-type stabilizer, 1 part by weight of an antioxidant, 3.5 parts of a lubricant, 4 parts of titanium dioxide and 0.04 parts of carbon black.

The blended product was mixed in a Henschel mixer to obtain homogeneous blended product.

The blend was kneaded by 8 inch rolls at 200° C. for 3 min, pressed by a press machine at 200° C. for 10 min and then cut to obtain a specimen. When a Charpy impact test was conducted at 23° C. according to JIS K 7111, a Charpy test value was 49 kg·cm/cm². Further, a Vicat softening point at a load of 1 kg according to JIS K 7206 was 109° C., and a Vicat softening point at a load of 5 kg was 100° C.

Further, the blend was pelletized by a single axis extruder of 50 mm(φ) at a dice temperature of 190° C. The flow value by Koka type B method of the pellet at 205° C. at a load of 300 kg for nozzle of 1 φ and 10 mm length was 0.012 cc/sec. When the pellets were injection molded into 2 inch joints by using an injection molder of 50 mm (φ) screw (Toshiba IS-170G-10A) under the conditions at a nozzle temperature of 190° C., at a cylinder top temperature of 185° C. and a mold temperature of 40° C., joints with excellent surface property were obtained.

Usually, as the physical properties of the composition for heat resistant joins, the impact strength, the heat resistance, the fluidity and the surface property are important factors.

The impact strength was evaluated according to the Charpy impact test value and 15 kg·cm/cm² or more is preferred. In a case where it is less than 15 kg·cm/cm², a problem such as cracking occurs during fabrication of molded products.

The heat resistance was evaluated by the Vicat softening point at a load of 5 kg according to JIS standards and it must be of 95° C. or higher. In the actual use after working, higher heat resistant temperature is more preferred since there is less problem such as expansion upon passage of hot water or liquid chemicals.

The fluidity was evaluated by the flow value by Koka type B method flow value indicating the favorable flow in the mold during injection molding. For the chlorinated vinyl chloride-based resin composition for use in heat resistant joints, a higher value is more preferred and the flow value by the Koka type B method is preferably 0.008 cc/sec or more in order to provide favorable fluidity in injection molding.

A surface property of the joint was judged as favorable or blooming depending on whether blooming was present or not by visual observation. The judgments described above were also identical in the following Examples 2 to 9 and Comparative Examples 1 to 4.

Example 2

Except for using 3 parts of an MBS resin with the butadiene content of 70% of the entire MBS resin and 3 parts of H 135, blending was conducted in the same manner as in Example 1, and the blended product was mixed by a Henschel mixer to obtain a homogenous blended product.

The composition was kneaded by 8 inch rolls at 200° C. for 3 min, pressed by a press machine at 200° C. for 10 min and then cut to obtain a test specimen. The Charpy impact test value was 37 kg·cm/cm$^2$, and a Vicat softening point at a load of 1 kg was 110° C. and a Vicat softening point at a load of 5 kg was 99° C.

Further, when the blended product was pelletized by the same method as in Example 1, the flow value by the Koka type B method of the pellets was 0.015 cc/sec. When the pellets were injection molded into a 2 inch joint by the same method as in Example 1, joints with an excellent surface were obtained.

Example 3

Except for using 2 parts of PA 10, blending was conducted in the same manner as in Example 1, and the blended product was mixed by a Henschel mixer to obtain a homogenous blended product.

The composition was kneaded by 8 inch rolls at 200° C. for 3 min, pressed by a press machine at 200° C. for 10 min and then cut to obtain a test specimen. The Charpy impact test value was 37 kg·cm/cm$^2$, and a Vicat softening point at a load of 1 kg was 110° C. and a Vicat softening point at a load of 5 kg was 100° C.

Further, when the blended product was pelletized by the same method as in Example 1, the flow value by the Koka type B method of the pellets was 0.009 cc/sec. When the pellets were injection molded into a 2 inch joint by the same method as in Example 1, joints with an excellent surface were obtained.

Example 4

Except for using 2 parts of TYRIN 3615P with a chlorine content of 36% (chlorinated polyethylene manufactured by Dupont Dow Elastomer Co.) and not using H 135, blending was conducted in the same manner as in Example 1, and the blended product was mixed by a Henschel mixer to obtain a homogenous blended product.

The composition was kneaded by 8 inch rolls at 200° C. for 3 min, pressed by a press machine at 200° C. for 10 min and then cut to obtain a test specimen. The Charpy impact test value was 45 kg·cm/cm$^2$, and a Vicat softening point at a load of 1 kg was 109° C. and a Vicat softening point at a load of 5 kg was 100° C.

Further, when the blended product was pelletized by the same method as in Example 1, the flow value by the Koka type B method of the pellets was 0.012 cc/sec. When the pellets were injection molded into a 2 inch joint by the same method as in Example 1, joints with an excellent surface were obtained.

Example 5

Except for not using titanium dioxide and carbon black, and using 0.16 parts of brown color pigment (BROWN D-8828 manufactured by Dai Nippon Ink Co.), blending was conducted in the same manner as in Example 1, and the blended product was mixed by a Henschel mixer to obtain a homogenous blended product.

The composition was kneaded by 8 inch rolls at 200° C. for 3 min, pressed by a press machine at 200° C. for 10 min and then cut to obtain a test specimen. The Charpy impact test value was 59 kg·cm/cm$^2$, and a Vicat softening point at a load of 1 kg was 109° C. and a Vicat softening point at a load of 5 kg was 99° C.

Further, when the blended product was pelletized by the same method as in Example 1, the flow value by the Koka type B method of the pellets was 0.012 cc/sec. When the pellets were injection molded into a 2 inch joint by the same method as in Example 1, joints with an excellent surface were obtained.

Example 6

Except for using 100 parts of a chlorinated vinyl chloride resin with a degree of chlorination of 67% obtained by post-chlorinating a vinyl chloride resin of a polymerization degree of 700, blending was conducted in the same manner as in Example 1, and the blended product was mixed by a Henschel mixer to obtain a homogenous blended product.

The composition was kneaded by 8 inch rolls at 200° C. for 3 min, pressed by a press machine at 200° C. for 10 min and then cut to obtain a test specimen. The Charpy impact test value was 49 kg·cm/cm$^2$, and a Vicat softening point at a load of 1 kg was 113° C. and a Vicat softening point at a load of 5 kg was 102° C.

Further, when the blended product was pelletized by the same method as in Example 1, the flow value by the Koka type B method of the pellets was 0.010 cc/sec. When the pellets were injection molded into a 2 inch joint by the same method as in Example 1, joints with an excellent surface were obtained.

Example 7

Except for using 100 parts of a chlorinated vinyl chloride resin with a degree of chlorination of 68% obtained by post-chlorinating a vinyl chloride resin of a polymerization degree of 600 and not adding PA 10 as the processability improver, blending was conducted in the same manner as in Example 1, and the blended product was mixed by a Henschel mixer to obtain a homogenous blended product.

The composition was kneaded by 8 inch rolls at 200° C. for 3 min, pressed by a press machine at 200° C. for 10 min and then cut to obtain a test specimen. The Charpy impact test value was 33 kg·cm/cm², and a Vicat softening point at a load of 1 kg was 118° C. and a Vicat softening point at a load of 5 kg was 107° C.

Further, when the blended product was pelletized by the same method as in Example 1, the flow value by the Koka type B method of the pellets was 0.019 cc/sec. When the pellets were injection molded into a 2 inch joint by the same method as in Example 1, joints with an excellent surface were obtained.

Example 8

Except for using 100 parts of a chlorinated vinyl chloride resin with a degree of chlorination of 68% obtained by post-chlorinating a vinyl chloride resin of a polymerization degree of 600 and not adding PA 10 as the processability improver and increasing the lubricant to 4 parts, blending was conducted in the same manner as in Example 1, and the blended product was mixed by a Henschel mixer to obtain a homogenous blended product.

The composition was kneaded by 8 inch rolls at 200° C. for 3 min, pressed by a press machine at 200° C. for 10 min and then cut to obtain a test specimen. The Charpy impact test value was 29 kg·cm/cm², and a Vicat softening point at a load of 1 kg was 118° C. and a Vicat softening point at a load of 5 kg was 106° C.

Further, when the blended product was pelletized by the same method as in Example 1, the flow value by the Koka type B method of the pellets was 0.020 cc/sec. When the pellets were injection molded into a 2 inch joint by the same method as in Example 1, joints with an excellent surface were obtained.

Example 9

Except for using 100 parts of a chlorinated vinyl chloride resin with a degree of chlorination of 68% obtained by post-chlorinating a vinyl chloride resin with a polymerization degree of 600 and adding one part of PA 20 (resin for improving the processability of vinyl chloride manufactured by Kaneka Corporation.) instead of PA 10 as the processability improver, blending was conducted in the same manner as in Example 1 and the blend was mixed by a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 26 kg·cm/cm², a Vicat softening point at a load of 1 kg was 118° C. and a Vicat softening point at a load of 5 kg was 106° C.

Further, when the blended product was pelletized by the same method as in Example 1, the flow value by the Koka type B method of the pellets was 0.016 cc/sec. When the pellets were injection molded into a 2 inch joint in the same method as in Example 1, joints with excellent surface were obtained.

Example 10

Except for using 6 parts by weight of an MBS resin with a butadiene content of 46% in the MBS resin, blending was conducted in the same manner as in Example 8, and the blend was mixed in a Henschel mixer to obtain a homogeneous compositions.

The composition was kneaded by 8 inch rolls at 200° C. for 3 min, pressed by a press machine at 200° C. for 10 min and then cut to obtain a test specimen. A Charpy impact test value was 29 kg·cm/cm², a Vicat softening point at a load of 1 kg was 116° C. and a Vicat softening point at a load of 5 kg was 104° C.

Further, when the blended product was pelletized by the same method as in Example 1, the flow value by the Koka type B method of the pellets was 0.017 cc/sec. When the pellets were injection molded into a 2 inch joint in the same method as in Example 8, joints with excellent surface were obtained.

Example 11

Except for using 4 parts by weight of an MBS resin with a butadiene content of 46% in the MBS resin, blending was conducted in the same manner as in Example 10, and the blend was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 20 kg·cm/cm², a Vicat softening point at a load of 1 kg was 118° C. and a Vicat softening point at a load of 5 kg was 106° C.

Further, when the blended product was pelletized by the same method as in Example 1, the flow value by the Koka type B method of the pellets was 0.020 cc/sec. When the pellets were injection molded into a 2 inch joint in the same method as in Example 8, joints with excellent surface were obtained.

Comparative Example 1

Except for using only 6 parts of B56 with a butadiene content of 70% (MBS resin manufactured by Kaneka Corporation.) as an impact absorbent and not using the chlorinated polyethylene chloride and the resin for improving the processability of vinyl chloride, blending was conducted in the same manner as in Example 1 and the blended product was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 45 kg·cm/cm², a Vicat softening point at a load of 1 kg was 110° C. and a Vicat softening point at a load of 5 kg was 99° C.

Further, when the blended product was pelletized by the same method as in Example 1, the flow value by the Koka type B method of the pellets was 0.013 cc/sec. When the pellets were injection molded into a 2 inch joint in the same method as in Example 1, only the joints with blooming on the surface were obtained.

Comparative Example 2

Except for excluding the resin for improving the processability of vinyl chloride, blending was conducted in the same manner as in Example 1 and the blend was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 39 kg·cm/cm², a Vicat softening point at a load of 1 kg was 109° C. and a Vicat softening point at a load of 5 kg was 99° C.

Further, when the blended product was pelletized by the same method as in Example 1. The flow value by the Koka type B method of the pellets was 0.014 cc/sec. When the pellets were injection molded into a 2 inch joint in the same method as in Example 1, only the joints with blooming on the surface were obtained.

Comparative Example 3

Except for using 100 parts of a chlorinated vinyl chloride resin with a degree of chlorination of 67% obtained by post-chlorinating a vinyl chloride resin of a polymerization degree of 700 and using only 6 parts of B56 with the butadiene content of 70% (MBS resin manufactured by Kaneka Corporation.) as the impact absorbent and not using the chlorinated polyethylene and the resin for improving the processability of the vinyl chloride, blending was conducted in the same manner as in Example 1, and the blended product was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 41 kg·cm/cm$^2$, a Vicat softening point at a load of 1 kg was 114° C. and a Vicat softening point at a load of 5 kg was 103° C.

Further, when the blended product was pelletized by the same method as in Example 1. The flow value by the Koka type B method of the pellets was 0.007 cc/sec. When the pellets were injection molded into a 2 inch joint in the same method as in Example 1, only the joints with blooming on the surface were obtained.

Comparative Example 4

Except for using 100 parts of a chlorinated vinyl chloride resin with a degree of chlorination of 67% obtained by post-chlorinating a vinyl chloride resin of a polymerization degree of 700 and not using the resin for improving processability of vinyl chloride, blending was conducted in the same manner as in Example 1, and the blended product was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 48 kg·cm/cm$^2$, a Vicat softening point at a load of 1 kg was 113° C. and a Vicat softening point at a load of 5 kg was 103° C.

Further, when the blended product was pelletized by the same method as in Example 1. The flow value by the Koka type B method of the pellets was 0.008 cc/sec. When the pellets were injection molded into a 2 inch joint in the same method as in Example 1, only the joints with blooming on the surface were obtained.

Comparative Example 5

Except for using 6 parts by weight of an MBS resin with the butadiene content of 46% of the entire MBS resin instead of the MBS resin in Comparative Example 3, blending was conducted in the same manner as in Comparative Example 3, and the blended product was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 29 kg·cm/cm$^2$, a Vicat softening point at a load of 1 kg was 115° C. and a Vicat softening point at a load of 5 kg was 104° C.

Further, when the blended product was pelletized by the same method as in Example 1, the flow value by the Koka type B method of the pellets was 0.013 cc/sec. When the pellets were injection molded into a 2 inch joint in the same method as in Comparative Example 3, only the joints with blooming on the surface were obtained.

Comparative Example 6

Except for using 6 parts by weight of an MBS resin with the butadiene content of 54% of the entire MBS resin instead of the MBS resin in Comparative Example 3, blending was conducted in the same manner as in Comparative Example 3, and the blended product was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 29 kg·cm/cm$^2$, a Vicat softening point at a load of 1 kg was 115° C. and a Vicat softening point at a load of 5 kg was 104° C.

Further, when the blended product was pelletized by the same method as in Example 1. The flow value by the Koka type B method of the pellets was 0.012 cc/sec. When the pellets were injection molded into a 2 inch joint in the same method as in Comparative Example 3, only the joints with blooming on the surface were obtained.

Comparative Example 7

Except for using 5 parts by weight of an MBS resin with the butadiene content of 70% of the entire MBS resin instead of the MBS resin in Comparative Example 4, blending was conducted in the same manner as in Comparative Example 4, and the blended product was mixed in a Henschel mixer to obtain a homogeneous composition.

The composition was kneaded by 8 inch rolls at 200° C. for 3 min, pressed by a press machine at 200° C. for 10 min and then cut to obtain a test specimen. A Charpy impact test value was 60 kg·cm/cm$^2$, a Vicat softening point at a load of 1 kg was 115° C. and a Vicat softening point at a load of 5 kg was 103° C.

Further, when the blended product was pelletized by the same method as in Example 1, the flow value by the Koka type B method of the pellets was 0.011 cc/sec. When the pellets were injection molded into a 2 inch joint in the same method as in Example 1, only the joints with blooming on the surface were obtained.

Comparative Example 8

Except for using 4 parts by weight of an MBS resin with the butadiene content of 70% of the entire MBS resin in Comparative Example 7 and 3 parts by weight of H135 with a chlorine content of 35% (chlorinated polyethylene manufactured by Daiso Co. Ltd.), blending was conducted in the same manner as in Comparative Example 7, and the blended products was mixed in a Henschel mixer to obtain a homogeneous compositions homogeneous composition.

The composition was kneaded by 8 inch rolls at 200° C. for 3 min, pressed by a press at 200° C. for 10 min and then cut to obtain a test specimen. A Charpy impact test value was 55 kg·cm/cm$^2$, a Vicat softening point at a load of 1 kg was 114° C. and a Vicat softening point at a load of 5 kg was 103° C.

Further, when the blended product was pelletized by the same method as in Example 1, the flow value by the Koka type B method of the pellets was 0.011 cc/sec. When the pellets were injection molded into a 2 inch joint in the same method as in Example 1, only the joints with blooming on the surface were obtained.

Results of Example 1 to Example 11 are collected in Table 1 and the result of Comparative Example 1 to Comparative Example 8 are collected in Table 2.

INDUSTRIAL APPLICABILITY

According to the chlorinated vinyl chloride-based resin composition of the invention, since injection molding products having good surface property with no blooming on the surface can be obtained while maintaining the heat resistance, the impact strength and the moldability, this is useful in application uses, for example, in joints.

TABLE 1

| | | Exam. 1 | Exam. 2 | Exam. 3 | Exam. 4 | Exam. 5 | Exam. 6 | Exam. 7 | Exam. 8 | Exam. 9 | Exam. 10 | Exam. 11 |
|---|---|---|---|---|---|---|---|---|---|---|---|---|
| Chlorinated vinyl chloride resin | Polymerization degree 700 Chlorination degree 66 wt % | 100 | 100 | 100 | 100 | 100 | | | | | | |
| Chlorinated vinyl chloride resin | Polymerization degree 700 Chlorination degree 67 wt % | | | | | | 100 | | | | | |
| Chlorinated vinyl chloride resin | Polymerization degree 600 Chlorination degree 68 wt % | | | | | | | 100 | 100 | 100 | 100 | 100 |
| MBS resin | Butadiene content 70 wt % | 4 | 3 | 4 | 4 | 4 | 4 | 4 | 4 | 4 | | |
| MBS resin | Butadiene content 54 wt % | | | | | | | | | | | |
| MBS resin | Butadiene content 46 wt % | | | | | | | | | | 6 | 4 |
| H135 | | 2 | 3 | 2 | | | 2 | 2 | 2 | 2 | 2 | 2 |
| Tyrin 3615P | | | | | 2 | 2 | | | | | | |
| PA10 | | 1 | 1 | 2 | 1 | 1 | 1 | | | | | |
| PA20 | | | | | | | | | | 1 | | |
| Tin type stabilizer | | 3.5 | 3.5 | 3.5 | 3.5 | 3.5 | 3.5 | 3.5 | 3.5 | 3.5 | 3.5 | 3.5 |
| Antioxidant | | 1 | 1 | 1 | 1 | 1 | 1 | 1 | 1 | 1 | 1 | 1 |
| Lubricant | | 3.5 | 3.5 | 3.5 | 3.5 | 3.5 | 3.5 | 3.5 | 4 | 3.5 | 4 | 4 |
| Titanium dioxide | | 4 | 4 | 4 | 4 | | 4 | 4 | 4 | 4 | 4 | 4 |
| Carbon black | | 0.04 | 0.04 | 0.04 | 0.04 | | 0.04 | 0.04 | 0.04 | 0.04 | 0.04 | 0.04 |
| Brown pigment | | | | | | 0.16 | | | | | | |
| Butadiene content to chlorinated vinyl chloride resin | wt % | 2.8 | 2.1 | 2.8 | 2.8 | 2.8 | 2.8 | 2.8 | 2.8 | 2.8 | 2.8 | 1.8 |
| Charpy impact test value | kg · cm/cm² | 49 | 37 | 37 | 45 | 59 | 49 | 33 | 29 | 26 | 29 | 20 |
| Vicat softening point (1 kg load) | ° C. | 109 | 110 | 110 | 109 | 109 | 113 | 118 | 118 | 118 | 116 | 118 |
| Vicat softening point (5 kg load) | ° C. | 100 | 99 | 100 | 100 | 99 | 102 | 107 | 106 | 106 | 104 | 106 |
| Koka type B method flow value | cc/sec | 0.012 | 0.015 | 0.009 | 0.012 | 0.012 | 0.010 | 0.019 | 0.020 | 0.016 | 0.017 | 0.020 |
| Surface property of joint | | Favorable | Favorable | Favorable | Favorable | Favorable | Favorable | Favorable | Favorable | Favorable | Favorable | Favorable |

TABLE 2

| | | Comp. Exam. 1 | Comp. Exam. 2 | Comp. Exam. 3 | Comp. Exam. 4 | Comp. Exam. 5 | Comp. Exam. 6 | Comp. Exam. 7 | Comp. Exam. 8 |
|---|---|---|---|---|---|---|---|---|---|
| Chlorinated vinyl chloride resin | Polymerization degree 700 Chlorination degree 66 wt % | 100 | 100 | | | | | | |
| Chlorinated vinyl chloride resin | Polymerization degree 700 Chlorination degree 67 wt % | | | 100 | 100 | 100 | 100 | 100 | 100 |
| Chlorinated vinyl chloride resin | Polymerization degree 600 Chlorination degree 68 wt % | | | | | | | | |
| MBS resin | Butadiene content 70 wt % | 6 | 4 | 6 | 4 | | | 5 | 4 |
| MBS resin | Butadiene content 54 wt % | | | | | | 6 | | |
| MBS resin | Butadiene content 46 wt % | | | | | 6 | | | |
| H135 | | | | 2 | | 2 | | 2 | 3 |
| Tyrin 3615P | | | | | | | | | |
| PA10 | | | | | | | | | |
| PA20 | | | | | | | | | |
| Tin type stabilizer | | | | 3.5 | 3.5 | 3.5 | 3.5 | 3.5 | 3.5 |

TABLE 2-continued

|  |  | Comp. Exam. 1 | Comp. Exam. 2 | Comp. Exam. 3 | Comp. Exam. 4 | Comp. Exam. 5 | Comp. Exam. 6 | Comp. Exam. 7 | Comp. Exam. 8 |
| --- | --- | --- | --- | --- | --- | --- | --- | --- | --- |
| Antioxidant |  | 1 | 1 | 1 | 1 | 1 | 1 | 1 | 1 |
| Lubricant |  | 3.5 | 3.5 | 3.5 | 3.5 | 3.5 | 3.5 | 3.5 | 3.5 |
| Titanium dioxide |  | 4 | 4 | 4 | 4 | 4 | 4 | 4 | 4 |
| Carbon black |  | 0.04 | 0.04 | 0.04 | 0.04 | 0.04 | 0.04 | 0.04 | 0.04 |
| Brown pigment |  |  |  |  |  |  |  |  |  |
| Butadiene content to chlorinated vinyl chloride resin | wt % | 4.2 | 2.8 | 4.2 | 2.8 | 2.8 | 3.2 | 3.5 | 2.8 |
| Charpy impact test value | kg · cm/cm² | 45 | 39 | 41 | 48 | 29 | 29 | 60 | 55 |
| Vicat softening point (1 kg load) | ° C. | 110 | 109 | 114 | 113 | 115 | 115 | 115 | 114 |
| Vicat softening point (5 kg load) | ° C. | 99 | 99 | 103 | 103 | 104 | 104 | 103 | 103 |
| Koka type B method flow value | cc/sec | 0.013 | 0.014 | 0.007 | 0.08 | 0.013 | 0.012 | 0.011 | 0.011 |
| Surface property of joint |  | Blooming | Blooming | Blooming | Blooming | Blooming | Blooming | Blooming | Blooming |

The invention claimed is:

1. A chlorinated vinyl chloride-based resin composition for use in injection molding in which
    from 2 to 9 parts by weight of an MBS resin and from 0.5 to 3 parts by weight of chlorinated polyethylene are blended to 100 parts by weight of a chlorinated vinyl chloride-based resin with a chlorine content of from 62 to 70% by weight obtained by post-chlorinating a vinyl chloride-based resin;
    wherein an acrylic resin for improving the processability of vinyl chloride is further added to the blend, said acrylic resin comprises polymethyl methacrylate as a main ingredient and has a specific viscosity at 30° C. of not exceeding 1.5 when 0.4 g thereof is dissolved in 100 ml of benzene.

2. A chlorinated vinyl chloride-based resin composition for use in injection molding in which
    from 2 to 9 parts by weight of an MBS resin and from 0.5 to 3 parts by weight of chlorinated polyethylene are blended to 100 parts by weight of a chlorinated vinyl chloride-based resin with a chlorine content of from 62 to 70% by weight obtained by post-chlorinating a vinyl chloride-based resin;
    wherein an acrylic resin for improving the processability of vinyl chloride is further blended by from 0.5 to 3 parts by weight to the blend; and
    wherein the acrylic resin for improving the processability of vinyl chloride comprises polymethyl methacrylate as a main ingredient and has a specific viscosity at 30° C. of not exceeding 1.5 when 0.4 g thereof is dissolved in 100 ml of benzene.

3. A chlorinated vinyl chloride-based resin composition for use in injection molding in which
    from 2 to 9 parts by weight of an MBS resin and from 0.5 to 3 parts by weight of chlorinated polyethylene are blended to 100 parts by weight of a chlorinated vinyl chloride-based resin with a chlorine content of from 67 to 69% by weight obtained by post-chlorinating a vinyl chloride-based resin of an average polymerization degree of 650 or less;
    wherein an acrylic resin for improving the processability of vinyl chloride is further added to the blend, said acrylic resin comprises polymethyl methacrylate as a main ingredient and has a specific viscosity at 30° C. of not exceeding 1.5 when 0.4 g thereof is dissolved in 100 ml of benzene.

4. A chlorinated vinyl chloride-based resin composition according to claim 1, wherein the butadiene content of the MBS resin is larger than 60% by weight.

5. A chlorinated vinyl chloride-based resin composition according to claim 1, wherein the chlorine content of the chlorinated polyethylene is from 20 to 45% by weight.

6. A chlorinated vinyl chloride-based resin composition according to claim 1, wherein the Vicat softening point at a load of 5 kg is 105° C. or higher.

7. A heat resistant joint comprising a chlorinated vinyl chloride-based resin composition according to claim 1.

8. A chlorinated vinyl chloride-based resin composition according to claim 2, which uses a chlorinated vinyl chloride-based resin with a chlorine content of from 67 to 69% by weight obtained by post-chlorinating a vinyl chloride-based resin of an average polymerization degree of 650 or less.

9. A chlorinated vinyl chloride-based resin composition according to claim 2, wherein the butadiene content of the MBS resin is larger than 60% by weight.

10. A chlorinated vinyl chloride-based resin composition according to claim 2, wherein the chlorine content of the chlorinated polyethylene is from 20 to 45% by weight.

11. A chlorinated vinyl chloride-based resin composition according to claim 2, wherein the Vicat softening point at a load of 5 kg is 105° C. or higher.

12. A chlorinated vinyl chloride-based resin composition according to claim 2, wherein the butadiene content to 100 parts of the chlorinated vinyl chloride-based resin is 1 part by weight or more and 6 parts by weight or less.

13. A heat resistant joint comprising a chlorinated vinyl chloride-based resin composition according to claim 2.

14. A chlorinated vinyl chloride-based resin composition according to claim 3, wherein the butadiene content of the MBS resin is larger than 60% by weight.

15. A chlorinated vinyl chloride-based resin composition according to claim 3, wherein the chlorine content of the chlorinated polyethylene is from 20 to 45% by weight.

16. A chlorinated vinyl chloride-based resin composition according to claim 3, wherein the Vicat softening point at a load of 5 kg is 105° C. or higher.

17. A chlorinated vinyl chloride-based resin composition according to claim 3, wherein the butadiene content to 100 parts of the chlorinated vinyl chloride-based resin is 1 part by weight or more and 6 parts by weight or less.

18. A heat resistant joint comprising a chlorinated vinyl chloride-based resin composition according to claim 3.

* * * * *